Oct. 17, 1950

N. C. PRICE 2,526,409

TURBO-PROPELLER TYPE POWER PLANT HAVING
RADIAL FLOW EXHAUST TURBINE MEANS

Filed Jan. 9, 1945

Nathan C. Price
INVENTOR.

BY George C. Sullivan
Agent

Oct. 17, 1950 — N. C. PRICE — 2,526,409
TURBO-PROPELLER TYPE POWER PLANT HAVING RADIAL FLOW EXHAUST TURBINE MEANS
Filed Jan. 9, 1945 — 4 Sheets-Sheet 2
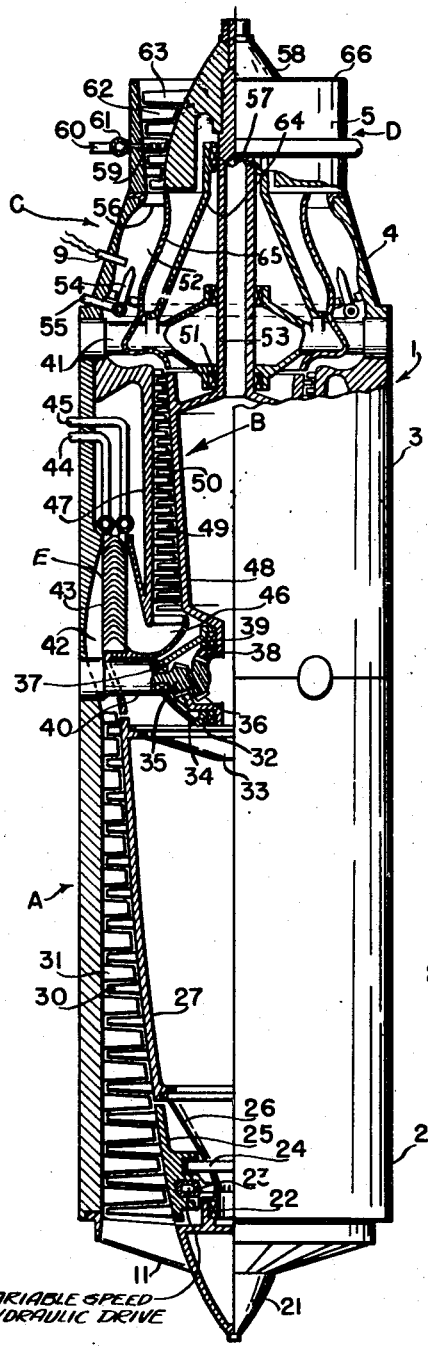
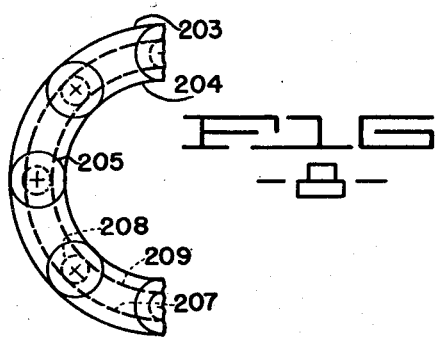
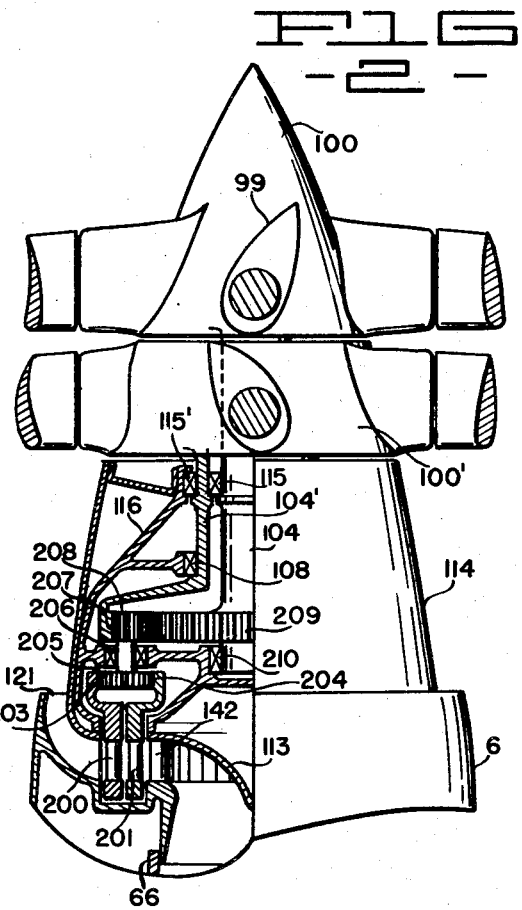
Nathan C. Price.
INVENTOR.
BY George C. Sullivan
Agent

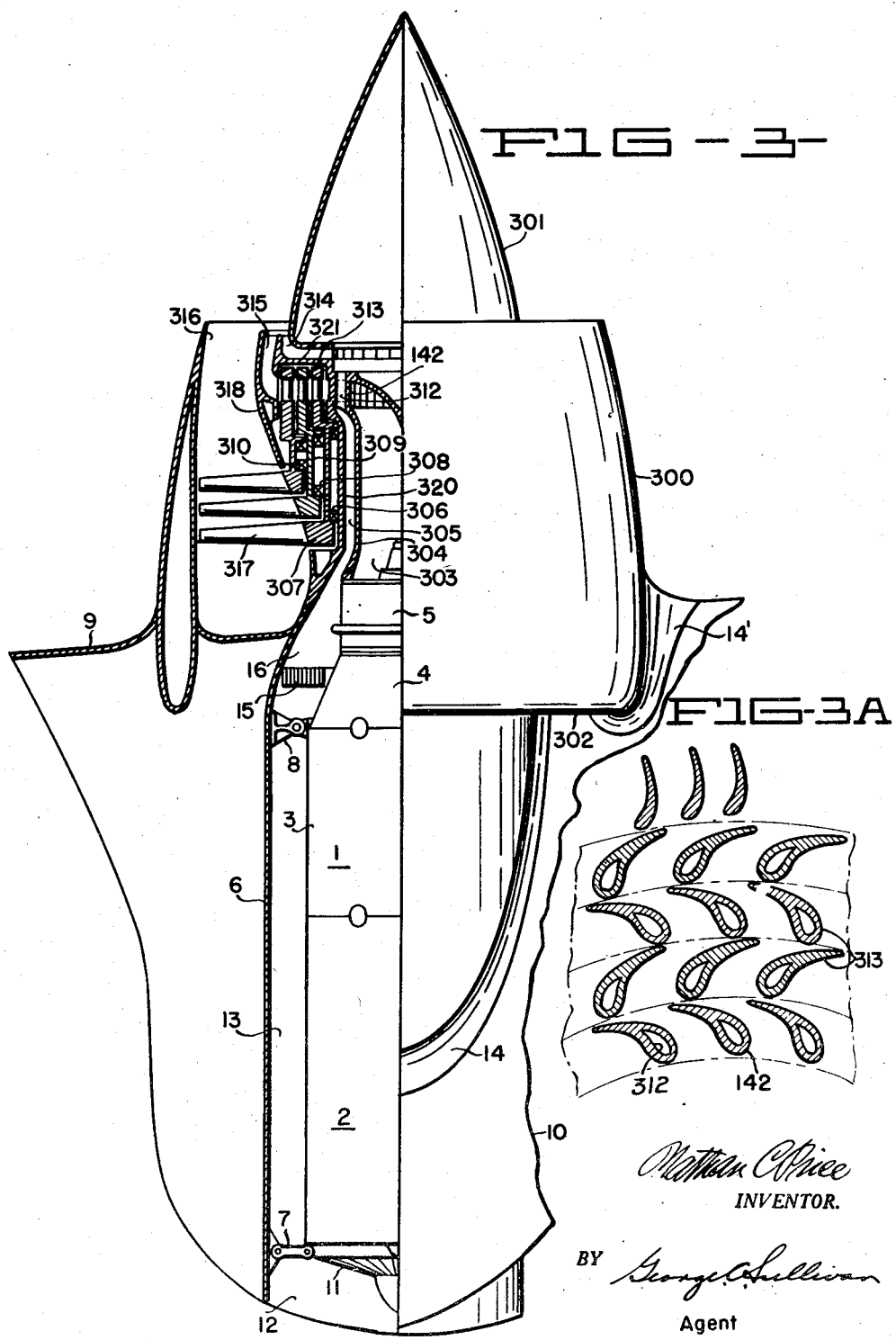

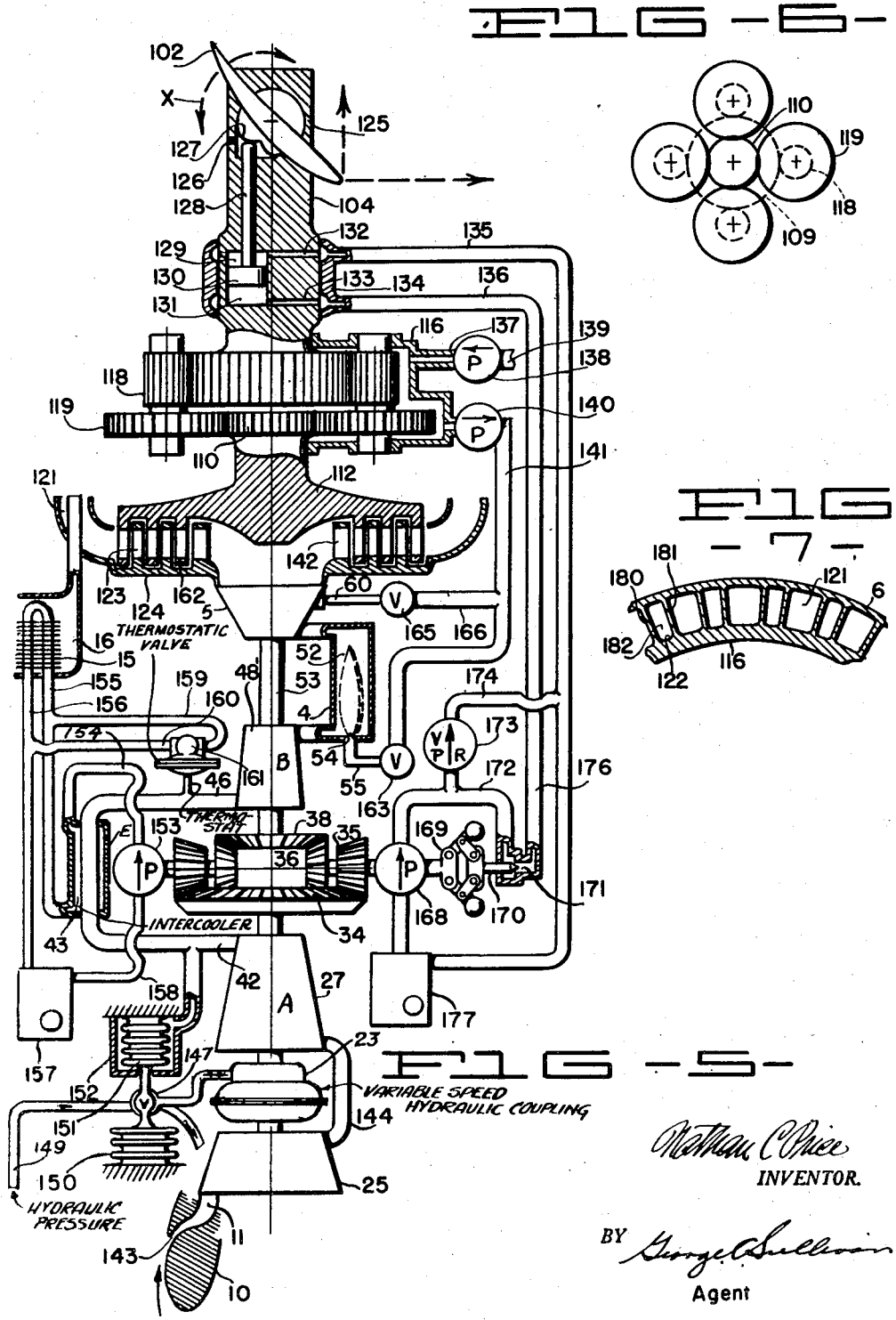

Patented Oct. 17, 1950

2,526,409

UNITED STATES PATENT OFFICE 2,526,409

TURBO-PROPELLER TYPE POWER PLANT HAVING RADIAL FLOW EXHAUST TURBINE MEANS

Nathan C. Price, Los Angeles, Calif., assignor to Lockheed Aircraft Corporation, Burbank, Calif.

Application January 9, 1945, Serial No. 571,999½

12 Claims. (Cl. 170—135.27)

This invention relates to power plants and relates more particularly to power plants of the compressor-turbo-propeller and reactive jet propulsion type, finding their principal application in aircraft and other high-speed vehicles. A general object of the invention is to provide propulsive systems of this class characterized by high thermal efficiency and suitable for use in airplanes, etc., having materially different intended operating speeds.

Another object of the invention is to provide an aircraft propulsion turbine plant embodying improved and highly effective internal aerodynamic means and effecting the reduction of the external wake losses usually resulting from propeller blading and exhaust gases.

Another object of the invention is to provide a constant speed hot gas producer and a variable speed propelled drive combination embodying multiplicities of reactive rotor vane sets which are inherently or automatically maintained at optimum operating efficiency in spite of the imposition of wide variations in power output, airplane speed, altitude and temperatures.

Another object of the invention is to provide a compact, readily installed propulsive engine of the character above referred to capable of large power output, having high cruising economy, extensive overload capacity, and substantial flexibility throughout a wide range of altitudes. The power plant of the invention is readily submerged within the wing of an airplane and is especially useful as a wing boundary layer suction device to improve the aerodynamic efficiency of the airplane as a whole.

It is another object of the invention to provide a power plant embodying primary elements useful in combination with certain easily interchangeable or selected secondary elements to obtain the maximum propulsive effectiveness for given airplanes, or types of airplanes, having widely different purposes; for example, high-speed fighters or low-speed, long-range cargo aircraft.

It is a further object of the invention to provide a turbo type engine for aircraft propulsion in which the configuration of the blading flow passages maintains normal highly efficient velocity distribution throughout, notwithstanding the employment of much higher combustion pressures and far greater expansion ratios than heretofore employed in conventional engines of this general class.

A still further object of the invention is to provide an improved turbo drive construction which avoids the use of stator blades and which may employ kerosene, or the like fuel, as a lubricating medium for the working parts prior to introduction into the combustion chamber, thereby recovering frictional energy which would otherwise be wasted and which loss has been an obstacle to efficient operation of plants designed to develop large shaft power.

The above and other objectives will become apparent from the following detailed description of the typical preferred embodiments of the invention illustrated in the accompanying drawings in which:

Figure 1 is a plan view, with certain parts appearing in longitudinal cross section, illustrating an embodiment of the power plant of the invention useful in long range, low-speed transport or freight airplanes;

Figure 2 is a fragmentary plan view similar to Figure 1, illustrating a form of turbine drive useful in a power plant for propelling medium speed, medium to long-range transport airplanes;

Figure 3 is a view similar to Figure 1, illustrating a power plant of the invention adapted for airplanes operating at high speeds;

Figure 3A is a view similar to Figure 2A illustrating the turbine blading of the plant shown in Figure 3;

Figure 4 is a plan view with certain major parts appearing in longitudinal cross section illustrating the compressor-turbo combination which serves as the gas producer for the motivation of the units illustrated in Figures 1, 2 and 3;

Figure 5 is a schematic diagram of the controls for regulating the power plant;

Figures 1A, 2A:
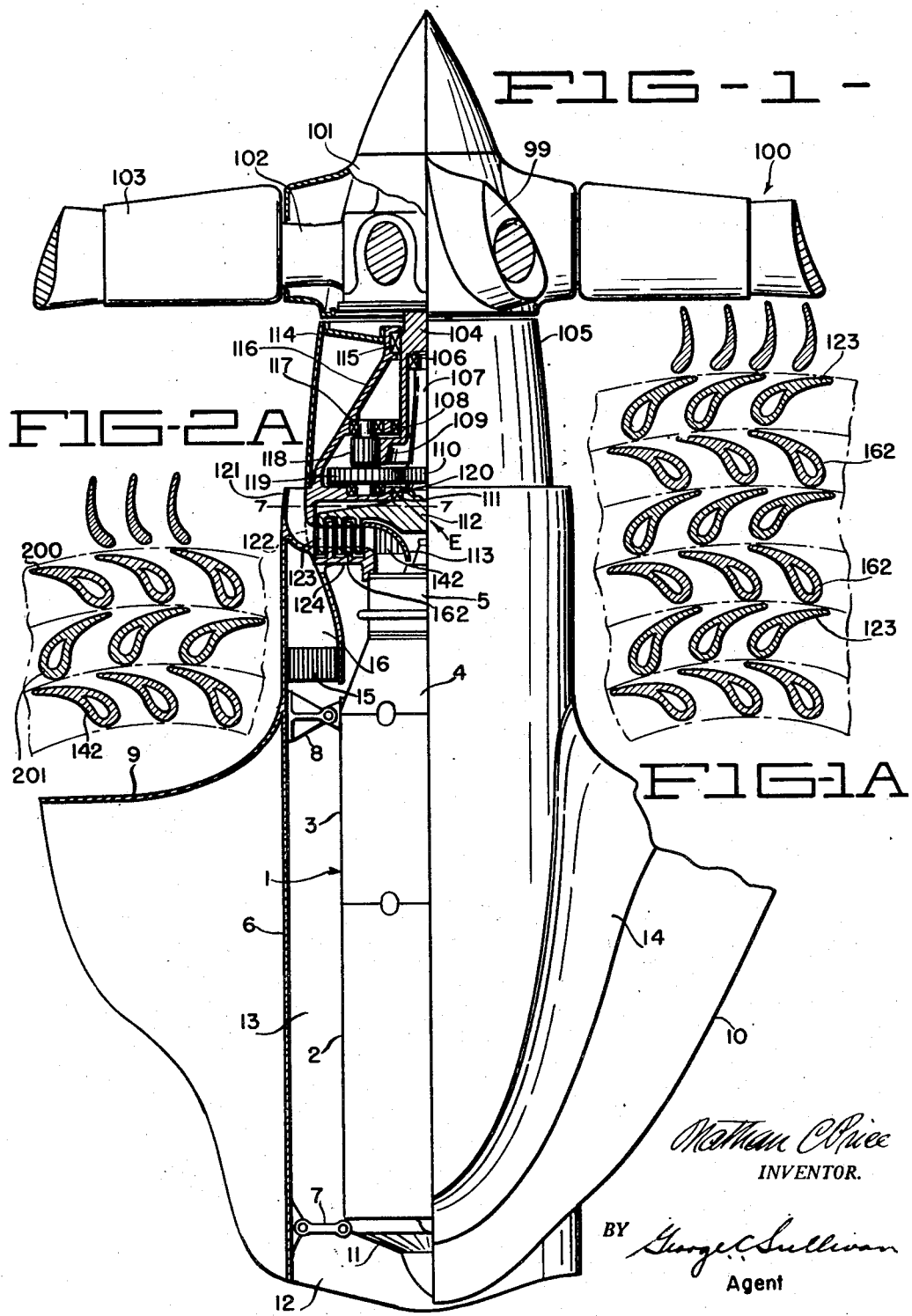
Figure 1A is a fragmentary, more or less diagrammatic view of the turbine blading employed in the plant of Figure 1.
Figure 2A is a fragmentary, diagrammatic view of the turbine blading of the plant shown in Figure 2.

Figure 6 schematically illustrates the arrangement of gear pitch lines in the propeller drive of Figure 1;

Figure 7 is a fragmentary sectional view of a preferred form of the exhaust gas ejector stack taken substantially as indicated by line 7—7 on Figure 1; and Figure 8 schematically illustrates the arrangement of gear pitch lines in the propeller drive of Figure 2.

In accordance with the invention, the hot gas producer 1, best illustrated in Figure 4, is capable of being employed with the drive and propulsive combinations of Figures 1, 2 and 3, and with similar arrangements for the propulsion of aircraft and other vehicles. I will first proceed with a description of the primary power plant unit, or gas producer 1 of Figure 4, and will subsequently describe its association in the combinations of Figures 1, 2 and 3.

The hot gas producer 1 comprises, generally, a low pressure axial flow compressor A, a high pressure axial flow compressor B, a combustion chamber C, and an axial flow gas turbine D, operated by the hot gases from the combustion chamber. These several primary elements of the unit 1 are housed in an elongate, generally cylindrical housing or casing assembly. This assembly includes a low pressure axial flow compressor casing 2, a high pressure axial flow compression casing 3, a combustion chamber casing 4, and an axial flow gas turbine casing 5.

The low pressure axial flow compressor A is intended to receive rammed air and the forward end of its casing 2 is equipped with an air inlet spider 11. The casing 2 may be of uniform internal diameter and is attached at its rear end to the casing 3 of the high pressure compressor B. A rotor 27 of appropriate configuration is arranged within the casing 2. A spider 40 is secured between the connected ends of the casings 2 and 3, and a conical hub 26 is provided on the forward end of the drum or rotor 27. The rotor 27 is journaled at the spider 40 by a bearing 32 and at the cylindrical land of the hub 26 by a bearing 22 to rotate about the central longitudinal axis of the assembly. The exterior of the rotor 27 is equipped with multiplicities of axially spaced rows of airfoil rotor blades 30 cooperating with rows of stator blading 31 provided on the interior of the casing 2. The drum or rotor 27 and its blading 30—31 are of rearwardly diminishing effective diameters as clearly shown in Figure 4. An annular discharge duct 42 leads rearwardly from the low compression axial blading 30—31 to the high compression axial flow compressor B.

The forward or air inlet portion of the low pressure axial flow compressor A is provided with an independently rotatable drum section 25. The drum section 25 is journaled on a bearing land 24 of the hub 26. In accordance with the invention, the drum section 25 is independently driven and controlled so that its speed of rotation may be varied with respect to that of the drum 27 to compensate for variations in air pressure at the inlet spider arising by reason of airplane speed or atmospheric pressure conditions. The drive for the drum section 25 comprises a variable speed hydraulic drive unit 23, the approximate mechanical equivalent of which is illustrated in Figure 5. The variable hydraulic drive unit 23 may be of the type disclosed in United States Letters Patent 2,379,183 granted June 26, 1945. The present invention is not primarily concerned with the details of the unit 23 and such details are accordingly omitted. The means for effecting control of the independently driven forward drum section will be subsequently described in connection with the other control means.

The high pressure axial flow compressor B includes a rotor 48 arranged coaxially within the casing 3 and supported for rotation independently of the low pressure rotor 27. A spider 41 is secured between the attached ends of the casings 3 and 4, and the rotor is suitably journaled on the spaced spiders 40 and 41. In the drawings I have shown suitable bearings 39 and 51 in the spiders 40 and 41, respectively, for mounting cylindrical lands of the rotor 48. The active portion of the rotor 48 is of forwardly diminishing effective diameter and carries a plurality of axially spaced rows of airfoil rotor blades 50. The drum operates in a tubular wall member 47 suitably secured in the casing 3. This sub-casing member 47 presents an internal cylindrical surface in concentric relation to the rotor 48, and rows of airfoil stator blades 49 are secured to this wall to be in cooperative relation to the rotor blades 50. The above mentioned annular discharge duct 42 of the low pressure axial flow compressor A leads to an annular rearwardly directed inlet duct 46 of the high pressure axial flow compressor B.

The invention includes an intercooler E situated in the path of the air stream flowing from the discharge duct 42 of the low pressure compressor A to the inlet duct 46 of the high pressure axial flow compressor B. The intercooler E is annular and occupies an intermediate position in the chamber interconnecting the two ducts. The core 43 of the intercooler is fed by a controlled supply of liquid coolant such as an ethylene-glycol-water solution, by a tube 44. A discharge tube 45 leads from the intercooler core 43. The circulatory system for the intercooler E will be later described.

The rotor 48 of the high pressure axial flow compressor B rotates at a velocity greater than that of the drum 27 of the low pressure axial flow compressor A, and a suitable speed reduction gearing is provided to effect this speed differential. The speed change device is interposed between the rotors and is housed within the hub of the spider 40. The gearing includes a beveled drive gear 38 on the forward end of the rotor 48, and a right angle pinion cluster comprising a driven bevel pinion 36 and a driving bevel pinion 35. A driven bevel gear 34 on the rear end of the rotor 27 is in mesh with the driving pinion 35. The pinions 35 and 36 are journaled by a bearing 37 mounted in the spider 40. Under typical operating conditions the drum 27 of the low pressure axial flow compressor will rotate at 3,000 R. P. M. and the rotor 48 of the high compression compressor will operate at about 15,600 R. P. M.

The casing 4 of the combustion chamber C is a tubular frusto-conical element secured to the rear end of the cylindrical casing 3 of the high pressure axial flow compressor B. The casing 5 of the turbine D constitutes a cylindrical rearward extension of the combustion chamber casing 4. A concentric annular shroud 65 is mounted in the casing 4 through the medium of the spider 41 and a nozzle ring 56. The shroud 65 is spaced inwardly from the wall of the casing 4 so that the shroud and casing define an annular combustion space 52. The shroud 65 continues forwardly to the discharge of the high pressure axial flow compressor, and together with the member 47, defines an annular passage of rearwardly increasing capacity for conducting the highly compressed, previously intercooled, air from the blading of compressor B to the combustion space 52. An annular series of rearwardly directed fuel injection nozzles 54 is arranged in the forward portion of the combustion space 52. The nozzles 54 are fed with the selected fuel by a fuel supply line 55 terminating in an annular manifold which carries the nozzles and distributes the fuel thereto. It will be seen that the highly compressed air issuing from the compressor B is directed past the fuel injection nozzles 54. One or more electrical glow plugs 9 are provided at the combustion space to ignite the fuel and air mixture formed therein.

The gases of combustion and the excessive air under pressure, if any, issuing from the combustion space 52 drive the axial flow turbine. The gases are collected by the nozzle ring 56 and are injected into the casing 5 at a high velocity. The turbine D includes a turbine wheel 58 of appropriate configuration coaxially positioned within the casing 5. Axial flow turbine buckets 63 are suitably secured to the rotor 58 and the interior of the casing 5 carries intermediate turbine vanes 62. The turbine wheel or rotor 58 drives the rotor 48 of the high pressure axial flow compressor through the medium of a tubular shaft 53 extending rearwardly from the rotor 48. The turbine wheel 58 is suitably fixed to the rear portion of the shaft 53. The shaft is stabilized adjacent the turbine wheel 58 by a bearing 57 in the apex portion of a tubular frusto-conical member 64. The member 64 is attached to and extends rearwardly from the rear spider 41 and is spaced inwardly from the shroud 65 of the combustion chamber. The speed of the turbine wheel 58 is maintained constant by a speed governor 169, controlling turbine speed by variation of the turbine back pressure as will be subsequently described.

The gas producer 1 includes means for injecting fuel into the turbine D beyond the combustion chamber for overload operation of the power plant. This means includes a plurality of spaced fuel injection perforations 59 in one or more circumferential rows of the stator or intermediate turbine blades 62. An annular tubular fuel distributing manifold 61 surrounds the turbine casing 5 and has communication with the perforations 59. In practice the blading 62 may be hollow and the manifold may communicate with the interiors of the blades 62 which are provided with the perforations 59. A fuel supply line 60 delivers the liquid fuel into the manifold 61.

From the foregoing it will be apparent that the hot gas producer 1 is operable to provide a flow of heated working fluid under high pressures for the actuation of the other elements of the power plant in which the gas producer is embodied. The operational control adjustments to be later described, may be employed to cause the gas producer 1 to produce the maximum available energy of the fluid outflow at all times, irrespective of variable load and speed conditions prevailing in the other elements of the power plant.

I will now proceed with a description of the power plant assembly or combination of Figure 1, and its installation. The hot gas producer 1 described above is concentrically positioned in a tubular nacelle 6. The nacelle 6 may be cylindrical or of substantially uniform diameter throughout and is relatively small in diameter. Suitable axially spaced sets of mounting means or links 7 and 8 mount the gas producer 1 in spaced concentric relation to the wall of the nacelle 6. The nacelle 6 is built into the airplane wing 10, and extends rearwardly beyond its trailing edge 9. I have shown the nacelle 6 faired into the wing 10 by a suitable filet 14. The forward portion of the nacelle forms an air inlet passage and may be connected with a suitable rammed air inlet further forward in the wing 10. The air inlet passage leads to an annular space or passage 13 between the hot gas producer 1 and the nacelle.

The rear ends of the tubular nacelle 6 and hot gas producer 1 connect with a coaxial subassembly E, including a radial flow gas turbine, reduction gearing and propellor means. The gases issuing from the hot gas producer 1 serve to drive the radial flow turbine and the turbine, in turn, serves to drive a variable pitch propeller 100 of the pusher type. The blades of the propeller 100 are provided with the usual cuffs 103. The radial flow turbine includes a disc shaped wheel 112, carrying on its forward face radially spaced rows of squirrel cage buckets 123. The buckets 123 are alternated with rows of squirrel cage turbine intermediate vanes 162 and a turbine nozzle ring 142. The vanes 162 and nozzle ring 142 are secured to a plate 124, attached to the outlet end of the casing 5 of the axial flow turbine, forming the rear element of the gas producer 1. Figure 1A illustrates in a diagrammatic manner the formation and arrangement of the vanes 123 and 162. The vanes or buckets 123 and 162 are preferably precision castings electric resistance welded to their respective supports. It is also preferred to make the vanes hollow to reduce their weight and obtain the additional strength of tube-form elements. The various stages of the buckets or vanes may be of substantially the same cross sectional configuration. It has been found that high efficiency is obtained by providing the leading edge portions of the vanes with a substantial camber, with the trailing edge portions relatively straight as illustrated in Figure 1A. A conoidal stator plate 113 is secured to the free end of the nozzle ring 142. The plate 113 deflects the compressed working fluid radially outward into the radial flow turbine. Upon passing through the radial flow turbine, the working fluid discharges rearwardly through an annular nozzle 121 at the periphery of the turbine.

The expansion of the working fluid effected in the radial flow turbine just described, is substantially complete, deriving large shaft horsepower at high efficiency. This implies a great change of specific volume of the working fluid in the radial flow turbine, which has a large ratio of exhaust flow area compared to the inlet flow area. The available energy in the working fluid is largely consumed within the radial flow turbine except for the residual velocity of efflux sufficient for the expulsion of the fluid propulsively from the annular nozzle 121 at a velocity of, say, 750 feet per second.

A frusto-conical housing 116 is provided to enclose the speed reduction gearing and to house the turbine wheel 112 and plate 124. As illustrated in Figures 1 and 7, the base end portion of the housing 116, which covers the rear side of the wheel 112 and the plate 124, is supported by spaced radial webs 180 and 181 extending across the annular nozzle 121 to the rear end portion of the nacelle 6. The gearing contained in the housing is adapted to effect an approximately eight to one speed reduction. The gearing includes a stub shaft 107 journaled at the center of the base part of the housing 116 by a main bearing 111.

The stub shaft 107 extends into a concentric hollow shaft 104 of the propeller 100 and is supported therein by an outboard bearing 106. A spur gear 110 is secured on the shaft 107 between the bearings 111 and 106, and engages stationary planetary gear clusters. The clusters include driven pinions 119 and driving pinions 118, and are journaled in the housing 116 by bearings 117 and 120. The driving pinions 118 engage a driven gear 109 at the front of the propeller shaft 104. The shaft 104 is journaled by axially spaced bearings 108 and 115 of the housing 116. It will be apparent how the radial flow turbine drives the propeller shaft 104 through the speed reduction gearing just described.

The invention provides means whereby the exhaust gas energy from the discharge of the radial flow turbine is recovered and utilized to assist in driving the propeller 100. A conoidal fairing 114 surrounds the gear housing 116 and extends rearwardly to merge with a streamlined hub 101 of the propeller 100. Relatively short airfoil cuffs 99 are provided on the hub 101. The cuffs 99 have a relatively steep angle of fixed pitch and act effectively as turbine buckets under the impingement of the efflux gases from the nozzle 121. The cuffs thus recover a substantial portion of the exhaust gas energy.

An annular radiator core 15 for the coolant used in the intercooling of the hot gas producer 1 is arranged in the space 13 between the gas producer and the nacelle 6. Air is induced to flow through the core 15 by jet induced suction at the nozzle 121. The broken line 122 in Figure 1 indicates the air ejection ducts 182 defined between the webs 180 and 181 of Figure 7. The air flow induced through the passage 13 and the ducts just referred to, serves to adequately cool both the webs 180 and 181 and the radiator core 15.

In Figure 2, I have illustrated a modified form of pusher propeller drive. This embodiment is suited for faster planes than the construction of Figure 1, and embodies a fore counter propeller 100' and an aft counter propeller 100 driven at relatively high rotative speeds and steep pitch. Greater velocity of ejected exhaust gases, for example, 1500 feet per second is permitted, producing a propeller drive embodiment utilizing a considerable amount of jet thrust; for example, 20% of the rated power. The propellers 100 and 100' are motivated by an inner radial flow turbine blading ring 201 and an outer counter rotating turbine blading ring 200, which are offset at their rear sides to form an external gear 204 and an internal gear 203, respectively. Figure 2A illustrates the form of preferred blading for the rings 200 and 201. The gears 204 and 203 have pitch diameters respectively less and slightly greater than the pitches of the blading rings 201 and 200. As shown in Figures 2 and 8, the gears 204 and 203 drive stationary planetary pinion clusters consisting of driven pinions 205 and driving pinions 208 journaled by bearings 206 in the gear housing 116. The driver pinions 208 engage an internal gear 207, which in turn, drives the fore propeller 100' through a hollow propeller shaft 104'. The external gear 209 also engaged by the driver pinions 208, drives the aft propeller 100 through a propeller shaft 104. The pitch diameters of the gears and pinions are preferably selected to allow the propellers 100 and 100', which may differ slightly in diameter, to operate at the same velocity at their tips. The turbine blading rings likewise operate at the same velocity with respect to the flow of working fluid if the gear ratios are chosen correctly, thereby providing optimum design efficiency of propeller and turbine blading.

The pitch line velocity of the gears 203 and 204, affording the support for the turbine blading rings 200 and 201, may in typical operation, be 40,000 feet per minute, which is high enough to provide the desirable thick film rather than boundary lubrication of the gear teeth, even when using a relatively light-bodied lubricant such as kerosene, which does not absorb large frictional energy. The light fuel or kerosene may be subsequently injected into the power plant for combustion, thereby recovering in the form of useful heat, frictional gear energy that would otherwise be lost. The above described planetary gear arrangement for journalling the turbine blading rings eliminates the need for separate bearings and, if desired, the gear teeth may be of the herringbone type rather than of the spur gear type to insure improved axial alignment of the turbine blading rings.

Figure 3 illustrates an embodiment of the power plant of this invention which is desirable for use in airplanes operating at very high speeds; for example, at speeds up to 550 miles per hour. The exit of the axial flow turbine D, of the hot gas producer 1, described above, is connected with a group of independently counter rotating squirrel cage turbine blading rings 313 by an axial duct 304. I have shown three blading rings, it being understood that any selected or required number of the rings 313 may be employed. Each turbine blading ring 313 has a forward upset tubular shoulder 309 terminating in a hoop 307 carrying axial flow compressor blading 317. The series of hoops 307 surrounds the duct 304. The speed of the axial flow compressor blading 317 is dependent upon the speed of the particular turbine blading ring to which it is connected. The association of the turbine blading and the axial flow blading provides for counter rotation of the blading and eliminates the necessity for stator vanes. The rotor shoulders 309 are telescopically related and are journaled one from the other, and jointly from the reduced diameter portion 320 of the nacelle 6 by suitably spaced journal rings 306. The reduced nacelle portion 320 extends from the nacelle proper to the nozzle ring 142. The bearings 306 are preferably of the slipper or pivotal segment type adapted to operate at high rubbing speed. The fuel or kerosene may be employed as a lubricant for the bearings 306 and is subsequently consumed as the fuel in the power plant. The annular air exhaust duct 16 leading from the radiator core 15 extends rearwardly through the constricted annular gap 305 bounded by the wall portion 320 and the wall of the duct 304. The duct 16 leads to axial hollows 312 in the nozzle ring 142. Air is drawn through this system of passages by an annular ejector slot 314 located between a terminal bearing cone 301 and an annular rearwardly directed exhaust ejector nozzle 315 of the radial flow turbine. The ejected air cools the radiator core 15, the portion 320 of the nacelle 6, and the nozzle ring 142. This air flow also cools a disc-shaped wall 321 at the rear side of the turbine blading rings 313.

The axial flow blading rings are shrouded in an annular airfoil 300 supported at the trailing edge 9 of the wing 10. The juncture of the airfoil 300 and the wing 10 is suitably faired by a filet 14'. To enable the blading to compress air from the boundary layer of the wing, which is conducive to improved aero-dynamic efficiency, the forward inlet 302 of the airfoil 300 defines a diffuser leading rammed, and therefore partially compressed, air to the axial flow blading 317, and thus lower the Mach number by slowing axial air velocity and by raising the air temperature which eliminates compressibility losses in the blading at high altitudes.

The respective diameters of the turbine blading rings 313, the cross sectional profile of the air passage within the annular airfoil 300 and the axial flow blading are preferably related and proportioned so that the turbine blading at the axial flow propeller blading each operate at a constant Mach number. The relative speeds of the freely "floating" rings of the turbine blading and axial flow propeller blading may vary with differently imposed load and/or altitude conditions during flight of the aircraft, thus improving both turbine and air blading efficiency.

The independently counter rotating turbine and compressor stages of the device of Figure 3 eliminate the necessity of providing stator vanes. Figure 3A illustrates in a more or less diagrammatic manner, the efficient type of turbine blading that may be on the rings 313. In the squirrel cage turbine blading other advantages accrue. For example, it is possible to have each of the following factors constant; solidarity, aspect ratio, chord, camber, flow incidence angle and blade section. Each of these factors may be selected to obtain maximum turbine efficiency.

In typical operating conditions at, say, 35,000 feet altitude, with an airplane speed of 450 miles per hour, the axial flow propeller blading 317 compresses 200 pounds air per second at a ratio of 1.5 to one, and subsequently expels this air propulsively through a restricted annulus 316 occurring between the bore of the annular airfoil 300 and a shroud 318 around the exhaust gas nozzle 315. The expelled air and the exhaust gas jet merge and flow together with the radiator exhaust air over the terminal fairing cone 301. The installation of Figure 3 may be constructed to produce approximately 3600 thrust horsepower under the above described conditions of operation.

Figure 5 diagrammatically illustrates the controls for the power plant of Figure 1, these controls being equally applicable to the embodiments of the invention illustrated in Figures 2 and 3.

As above mentioned, the speed of the floating drum section 25 at the forward end of the gas producer 1, is preferably varied with respect to the speed of the drum 27 to compensate for variations in the air pressure at the inlet spider 11 resulting from changes in the airplane speed and ambient atmospheric conditions. As shown in Figure 5, a control aneroid 151 is used to regulate the variable speed hydraulic drive unit 23 governing rotation of the drum section 25. The aneroid 151 is responsive to pressures in the duct 42 which leads from the discharge of compressor A to the inlet of compressor B, and the aneroid 151 is modulated by an ambient atmospheric pressure responsive aneroid 150. The aneroid control is operable to vary the rotative speeds of the driven drum 25 from between 5,000 and 8,000 R. P. M., in a typical case, to maintain a constant proportional ratio between inducted air weight flow rate of air for each altitude. For example, the inducted flow rate may be 35 pounds per second at sea level and 18 pounds per second at 35,000 feet altitude. It is preferable to regulate the temperature of the air at an essentially constant value, for example, 330° Fahrenheit, by a suitable thermostat in the duct 46 at the air discharge of the intercooler core 43, as will be later described. A boundary layer slot 143, provided in the wing 10, serves as an air supply source; see Figure 5. In order to effect the air pressure and weight flow control in the power plant the modulated aneroid 151 operates a valve 147. The valve 147 in turn regulates the delivery of hydraulic pressure to the hydraulic drive unit 23 through line 149. As described in my Patent Number 2,448,824 the variable speed drive unit 23 is operated or regulated by varying the hydraulic pressure supplied to it and in this application the aneroid 151 acting through the valve 147 regulates this pressure to control engagement of the floating axial flow compressor drum 25 with the low pressure axial flow compressor drum 27. Air pressure in the duct 42, at the exit of the blading of drum 27, is transmitted to a capsule 152 enclosing the aneroid 151, which is connected in opposition to the atmospheric aneroid 150 and to the valve 147. Excessive pressure acting upon the aneroid 151 tends to progressively disengage the variable speed drive unit 23. Deficient pressure tends to progressively engage the unit 23. For each given altitude there exists a desired pressure to be established in the duct 42, appropriately increased at lower altitudes by the operation of the aneroid 150 and decreased by the latter aneroid at higher altitudes.

The means for controlling the air temperatures within the power plant includes the circulatory pipes 154, 155, 156 and 158, and the by-pass ducts 159 and 160 for providing control circulation of liquid coolant between the intercooler core 43, the radiator core 15 and a coolant supply tank 157. A pump 153 is interposed between the lines 154 and 158 to circulate the coolant. A thermostatic valve 161 responsive to temperatures in the air duct 46, at the entrance of the high pressure axial flow compressor B, provides for the correct amount of circulation of coolant between the intercooler core 43 and the radiator 15 to maintain a constant temperature of the air. The thermostatic valve 161 is connected between the by-pass 160 and the pipe 159. The thermostatic by-pass 161 opens in the event the air tends to fall below the desired temperature, thereby varying the rate of heat transmission from the core 43 to the radiator 15. The intercooler and the associated control constitute the subject matter of my copending application, Serial Number 721,782, filed January 13, 1947.

In accordance with the invention, the axial flow turbine wheel 58 maintains a constant speed of rotation, and the radial flow turbine speed is made to vary in a manner conductive to optimum propeller performance. The means for effecting this control includes a speed governor 169 associated with a pinion 35 to be operated thereby. The governor regulates a needle valve 170 operable to admit oil pressure from a pump 168 to a tube 176. The throttle valve 170 is connected between the line 172 and the line 176, and cooperates with a seat 171. The tube 176 leads to a gland 134 and a propeller shaft orifice 133 extends from the gland to a piston 130. The piston 130 acts upon a push rod 128 engaging a lateral notch 127 at the base of the propeller blade 102, and is operable to vary the angle of incidence of the propeller blades indicated by the arrows. The inherent centrifugal rotational couple of the blade 102 tends to lower the angle of incidence with respect to the air stream. In the event the governor 169 tends to overspeed, the oil pressure acts to increase the propeller blade angle of incidence by building up pressure at the side 131 of the piston 130, decreasing the propeller speed and causing an increased back pressure to be established between the axial flow turbine D and the radial flow turbine. This serves to restore the speed of the governor 169 to a normal value. Pressure relief is provided at the side 129 of the piston 130 by an orifice 132 and an oil return tube 135 extending to the oil supply tank 171 for the pump 168. Since the control oil flow is varied by the governor 169, a pressure relief valve 173 and return tube 174 are connected between the pump discharge tube 172 and the return tube 135.

In the lubrication system of the invention, the kerosene or other like fuel supplied from a fuel source tube 139 is forced by a pump 138 through a tube 137 to the reduction gear housing 116 to lubricate the gears and bearings therein which are operating at high speeds. The lubricant is then scavenged by a high pressure pump 140 and conducted through tube 141 to the primary combustion chamber fuel control valve 163 and along a branch tube 166 to a supplemental fuel control valve 165. The valves 163 and 165 are under the control of the operator by either direct or remote control means.

While I have illustrated the invention embodied in typical preferred installations incorporating pusher propellers or blading, for the propulsion of the aircraft, it is to be understood that the installations of the invention may embody tractor type propellers or blading as will be apparent to those skilled in the art.

Having described only typical forms of the invention, I do not wish to be limited to the specific details herein set forth, but wish to reserve to myself any variations or modifications that may appear to those skilled in the art or fall within the scope of the following claims.

I claim:

1. In a power plant, a multi-stage air compressor of the airfoil vane type, an internal combustion turbine connected with the compressor, a combustion chamber between said compressor and turbine, speed governor means responsive to the speed of said turbine, an intercooler associated with said compressor for absorbing heat from the compressed air, a radial flow exhaust turbine connected with the exhaust of the internal combustion turbine to have the actuating gases exhausting therefrom flow radially outward through the exhaust turbine to drive the same, the exhaust turbine including rotating blading driven by said gases, a regulable load driven by said blading, a reduction in the rotative speed of said blading as a result of increased torque load thereon serving to increase the pressure drop in the exhaust turbine and thereby increase the back pressure imposed on the internal combustion turbine, means operable by said governor means for regulating the torque load imposed on said blading to thereby regulate the back pressure imposed on the internal combustion turbine, and thermostatic means responsive to the temperature of the compressed air in downstream relation to said intercooler and operable to regulate the heat absorption rate of said intercooler cooperatively with said speed governor means and said means operated thereby to maintain an optimum angle of incidence of the air being compressed with respect to the vanes of said compressor by maintaining air volumetric flow in said compressor at a substantially fixed ratio to the rotative speed of the compressor.

2. A high expansion ratio power plant comprising a multi-stage air compressor of the airfoil vane type, an internal combustion turbine connected with the compressor, a combustion chamber between said compressor and turbine, a speed governor responsive to the speed of said internal combustion turbine, said compressor including an independently variable speed stage at its inlet, a variable speed drive device connecting said variable speed stage to said turbine, a pressure sensitive element responsive to pressure within said compressor for regulating said variable speed drive device, a radial flow exhaust turbine connected to the exhaust of said internal combustion turbine for producing shaft power, and means operated by said governor to regulate the back pressure drop in said exhaust turbine and thus regulate the speed of said internal combustion turbine.

3. A power plant for driving an aircraft propeller having variable angle blades, comprising an air compressor, an internal combustion turbine connected with the compressor, a combustion chamber between said compressor and turbine, a variable speed radial flow exhaust turbine connected with the exhaust of said internal combustion turbine for driving said propeller, a servomotor for adjusting the angle of said blades to vary the load imposed on the exhaust turbine and thereby vary the speed of the same, and a speed governor associated with said internal combustion turbine for controlling said servomotor to thereby vary the back pressure imposed upon said internal combustion turbine by the radial flow exhaust turbine.

4. An aircraft power plant comprising an air compressor, an internal combustion turbine connected with the compressor, a combustion chamber between said compressor and turbine, a radial flow exhaust turbine connected with the exhaust of said internal combustion turbine, an air propeller for propelling the aircraft, drive means connecting said exhaust turbine with said air propeller to be in driving relationship thereto, a rearwardly directed annular nozzle at the outlet of said exhaust turbine for ejecting an annular stream of exhaust gases around said drive means, and blade surfaces on the propeller acted upon by said stream of gases.

5. An aircraft power plant comprising an air compressor and an internal combustion turbine of the axial flow type, a combustion chamber between the compressor and turbine, an exhaust turbine of the radial flow type connected with the exhaust of said internal combustion turbine, air propeller blading for propelling the aircraft, a casing enclosing the compressor and said internal combustion turbine, an intercooler core associated with said compressor surrounding said casing, said exhaust turbine being connected to said air propeller in driving relationship thereto, a rearwardly directed nozzle at the outlet of said exhaust turbine for propulsively ejecting exhaust gases, and one or more passages leading from said core to the interior of said nozzle for ejecting cooling air from said core in a rearward direction.

6. An aircraft power plant comprising an air compressor, an internal combustion turbine connected with the compressor, a combustion chamber between said compressor and turbine, an exhaust turbine connected with the exhaust of said internal combustion turbine, air propellers for propelling the aircraft, a plurality of pinions for driving the propellers, said exhaust turbine including a pair of counter-rotatable turbine stages of the radial flow type, each of said stages having a lateral shoulder forming a ring gear meshing with and journalled from said plurality of pinions for driving said propellers.

7. An aircraft power plant comprising an air compressor, an internal combustion turbine, a combustion chamber between said compressor and turbine, an exhaust turbine associated with the exhaust of the first named turbine to be driven thereby, air propeller blading driven by the exhaust turbine for propelling the aircraft, a rearwardly directed nozzle at the outlet of said exhaust turbine for propulsively ejecting exhaust gases, and means on said blading swept by the exhaust gases from said nozzle for recovering exhaust gas energy in driving said blading.

8. An aircraft power plant comprising an air compressor, an internal combustion turbine, a combustion chamber between said compressor and turbine, an exhaust turbine associated with the exhaust of the first named turbine to be driven thereby, air propeller blading driven by the exhaust turbine for propelling the aircraft, a rearwardly directed nozzle at the outlet of said exhaust turbine for propulsively ejecting exhaust gases, and means on said blading swept by the exhaust gases from said nozzle for recovering exhaust gas energy in driving said blading, said means including a cuff portion on the blading of turbine bucket form.

9. An aircraft power plant comprising an air compressor, an internal combustion turbine connected with the compressor, said compressor and internal combustion turbine being of the axial flow type, a combustion chamber between said compressor and turbine, an exhaust turbine connected with the exhaust of said internal combustion turbine, an air propeller at the rear of the exhaust turbine for propelling the aircraft, said exhaust turbine being of the radial flow type and connected to said air propeller in driving relationship thereto, a rearwardly directed nozzle at the outlet of said exhaust turbine for propulsively ejecting exhaust gases, and surfaces on the propeller acted upon by the gases discharged from the nozzle for assisting in driving the propeller.

10. An aircraft power plant comprising propeller means, a turbo-compressor unit for producing hot gases, a turbine driven by the gases and operable to drive the propeller means, and means for utilizing the exhaust from said turbine to assist in driving the propeller means comprising surfaces on the propeller means acted upon by the free exhaust gases following their issuance from said turbine.

11. An aircraft power plant comprising an air compressor, an internal combustion turbine connected with the compressor, a combustion chamber between the compressor and turbine, an exhaust turbine communicating with the exhaust of the internal combustion turbine, a plurality of independently rotatable air propeller blading rows for propelling the aircraft, said exhaust turbine including a plurality of independently rotatable turbine stages, and drive means between said turbine stages and said blading rows whereby each turbine stage drives an independent blading row, the drive means including lateral shoulders on the stages, ring gears on the stages, said ring gears being in concentric opposing relation, and pinions for driving said blading rows and meshing with said opposing ring gears to be rotated thereby and to journal said ring gears.

12. An aircraft power plant for arrangement in a nacelle comprising an axial flow compressor, a combustion chamber communicating with the compressor, an axial flow turbine in communication with the combustion chamber, said compressor, chamber and turbine being in coaxial end to end relation within the nacelle, propeller means at one end of the nacelle, a radial flow exhaust turbine communicating with the exhaust of said axial flow compressor to be driven by the exhaust gases therefrom, the exhaust turbine having an annular exhaust nozzle of approximately the same diameter as the nacelle for discharging the gases in a propulsive jet, and a reduction gear driven between the exhaust turbine and the propeller means arranged at the rear of the exhaust turbine.

NATHAN C. PRICE.

REFERENCES CITED

The following references are of record in the file of this patent:

UNITED STATES PATENTS

| Number | Name | Date |
| --- | --- | --- |
| 1,017,564 | Lake | Feb. 13, 1912 |
| 1,371,444 | Sherbondy | Mar. 15, 1921 |
| 1,766,886 | Elling | June 24, 1930 |
| 1,959,795 | Lysholm | May 22, 1934 |
| 2,050,349 | Lysholm et al. | Aug. 11, 1936 |
| 2,066,452 | Bernard | Jan. 5, 1937 |
| 2,082,397 | Hiscock | June 1, 1937 |
| 2,243,467 | Jendrassik | May 27, 1941 |
| 2,280,835 | Lysholm | Apr. 28, 1942 |
| 2,292,288 | Pateras Pescara | Aug. 4, 1942 |
| 2,306,953 | Jung | Dec. 29, 1942 |
| 2,371,889 | Hermitte | Mar. 20, 1945 |
| 2,372,686 | Sédille | Apr. 3, 1945 |
| 2,397,999 | Goddard | Apr. 9, 1946 |
| 2,404,767 | Heppner | July 23, 1946 |
| 2,405,919 | Whittle | Aug. 13, 1946 |
| 2,409,446 | Pavlecka et al. | Oct. 15, 1946 |
| 2,428,830 | Birmann | Oct. 14, 1947 |

FOREIGN PATENTS

| Number | Country | Date |
| --- | --- | --- |
| 372,377 | Great Britain | May 4, 1932 |
| 480,236 | Great Britain | Feb. 18, 1938 |
| 792,405 | France | Oct. 21, 1935 |

OTHER REFERENCES

"Flight" Magazine, published Feb. 17, 1944, page 171.